US008234156B2

(12) United States Patent
Comas et al.

(10) Patent No.: US 8,234,156 B2
(45) Date of Patent: Jul. 31, 2012

(54) SYSTEM AND METHOD FOR CHARACTERIZING AND SELECTING TECHNOLOGY TRANSITION OPTIONS

(75) Inventors: Andrew Comas, New York, NY (US); Olutayo Ibikunle, Montclair, NJ (US); Jeffrey Scott Saltz, Ridgewood, NJ (US); Yannling Pan, Short Hills, NJ (US); Andrew Michael Abrahams, New York, NY (US); Serena M. Starks, Guttenberg, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 2035 days.

(21) Appl. No.: 09/894,476

(22) Filed: Jun. 28, 2001

(65) Prior Publication Data
US 2003/0018573 A1  Jan. 23, 2003

(51) Int. Cl.
G06Q 10/00 (2012.01)
G06Q 40/00 (2012.01)
(52) U.S. Cl. ............... 705/7.37; 705/7.25; 705/7.36; 705/35
(58) Field of Classification Search ............ 705/40, 705/35–38; 370/352; 395/236
See application file for complete search history.

(56) References Cited

U.S. PATENT DOCUMENTS

| 4,751,702 | A |   | 6/1988  | Beier et al.        |        |
|-----------|---|---|---------|---------------------|--------|
| 5,027,269 | A |   | 6/1991  | Grant et al.        |        |
| 5,075,881 | A |   | 12/1991 | Blomberg et al.     |        |
| 5,208,765 | A |   | 5/1993  | Turnbull            |        |
| 5,220,501 | A | * | 6/1993  | Lawlor et al.       | 705/40 |
| 5,313,616 | A |   | 5/1994  | Cline et al.        |        |
| 5,347,518 | A |   | 9/1994  | Lee                 |        |
| 5,386,551 | A |   | 1/1995  | Chikira et al.      |        |
| 5,406,477 | A |   | 4/1995  | Harhen              |        |
| 5,446,895 | A |   | 8/1995  | White et al.        |        |
| 5,539,885 | A |   | 7/1996  | Ono et al.          |        |
| 5,549,117 | A |   | 8/1996  | Tacklind et al.     |        |
| 5,563,998 | A |   | 10/1996 | Yakish et al.       |        |
| 5,566,297 | A |   | 10/1996 | Devarakonda         |        |
| 5,594,863 | A |   | 1/1997  | Stiles              |        |
| 5,630,047 | A |   | 5/1997  | Wang                |        |
| 5,630,069 | A |   | 5/1997  | Flores et al.       |        |
| 5,655,074 | A |   | 8/1997  | Rauscher            |        |
| 5,692,233 | A |   | 11/1997 | Garman              |        |
| 5,701,471 | A |   | 12/1997 | Subramanyam         |        |

(Continued)

FOREIGN PATENT DOCUMENTS
WO   WO 01/74043   10/2001

OTHER PUBLICATIONS

Duggan, 2.40 General—Reviews and Abstracts, SPI Database of Software Technologies, p. 1-5, Feb. 1, 1974.

(Continued)

*Primary Examiner* — Gregory Johnson
(74) *Attorney, Agent, or Firm* — Hunton & Williams LLP

(57) ABSTRACT

Using adaptions of option pricing techniques from the financial industry, the invention provides systems and methods for structured development of migration options in a legacy transactional enterprise. Components and risk factors of the legacy enterprise are identified and determined, as well as components and risk factors of unmet opportunities, and potential components for the enterprise. Migration options for the enterprise are developed using the components and risk factors.

11 Claims, 8 Drawing Sheets

U.S. PATENT DOCUMENTS

| | | | |
|---|---|---|---|
| 5,712,971 A | 1/1998 | Stanfill et al. | |
| 5,721,913 A | 2/1998 | Ackroff et al. | |
| 5,721,914 A | 2/1998 | De Vries | |
| 5,745,880 A * | 4/1998 | Strothmann | 705/7.37 |
| 5,748,878 A | 5/1998 | Rees et al. | |
| 5,752,034 A | 5/1998 | Srivastava | |
| 5,758,061 A | 5/1998 | Plum | |
| 5,768,506 A | 6/1998 | Randell | |
| 5,781,448 A | 7/1998 | Nakamura et al. | |
| 5,784,562 A | 7/1998 | Diener | |
| 5,799,297 A | 8/1998 | Goodridge et al. | |
| 5,802,499 A | 9/1998 | Sampson et al. | |
| 5,806,075 A | 9/1998 | Jain et al. | |
| 5,812,988 A * | 9/1998 | Sandretto | 705/36 R |
| 5,819,237 A | 10/1998 | Garman | |
| 5,819,238 A | 10/1998 | Fernholz | |
| 5,828,883 A | 10/1998 | Hall | |
| 5,835,758 A | 11/1998 | Nochur et al. | |
| 5,835,770 A | 11/1998 | Shum et al. | |
| 5,842,196 A | 11/1998 | Agarwal et al. | |
| 5,845,292 A | 12/1998 | Bohannon et al. | |
| 5,852,811 A | 12/1998 | Atkins | |
| 5,872,976 A | 2/1999 | Yee et al. | |
| 5,884,037 A | 3/1999 | Aras et al. | |
| 5,884,286 A | 3/1999 | Daughtery, III | |
| 5,893,078 A | 4/1999 | Paulson | |
| 5,903,721 A | 5/1999 | Sixtus | |
| 5,903,897 A | 5/1999 | Carrier, III et al. | |
| 5,913,202 A | 6/1999 | Motoyama | |
| 5,920,719 A | 7/1999 | Sutton et al. | |
| 5,920,847 A * | 7/1999 | Kolling et al. | 705/40 |
| 5,930,762 A | 7/1999 | Masch | |
| 5,937,198 A | 8/1999 | Nelson et al. | |
| 5,940,810 A | 8/1999 | Traub et al. | |
| 5,960,196 A | 9/1999 | Carrier, III et al. | |
| 5,960,445 A | 9/1999 | Tamori et al. | |
| 5,970,479 A | 10/1999 | Shepherd | |
| 5,991,743 A | 11/1999 | Irving et al. | |
| 5,995,965 A | 11/1999 | Experton | |
| 6,003,075 A | 12/1999 | Arendt et al. | |
| 6,009,274 A | 12/1999 | Fletcher et al. | |
| 6,012,042 A | 1/2000 | Black et al. | |
| 6,016,483 A | 1/2000 | Rickard et al. | |
| 6,018,722 A | 1/2000 | Ray et al. | |
| 6,021,397 A | 2/2000 | Jones et al. | |
| 6,026,237 A | 2/2000 | Berry et al. | |
| 6,028,938 A | 2/2000 | Malkin et al. | |
| 6,029,002 A | 2/2000 | Afifi et al. | |
| 6,044,354 A | 3/2000 | Asplen, Jr. | |
| 6,058,393 A | 5/2000 | Meier et al. | |
| 6,061,503 A | 5/2000 | Chamberlain | |
| 6,061,686 A | 5/2000 | Gauvin et al. | |
| 6,067,412 A | 5/2000 | Blake et al. | |
| 6,073,107 A | 6/2000 | Minkiewicz et al. | |
| 6,078,903 A | 6/2000 | Kealhofer | |
| 6,078,904 A | 6/2000 | Rebane | |
| 6,088,685 A | 7/2000 | Kiron et al. | |
| 6,088,700 A | 7/2000 | Larsen et al. | |
| 6,091,893 A | 7/2000 | Fintel et al. | |
| 6,101,601 A | 8/2000 | Matthews et al. | |
| 6,108,673 A | 8/2000 | Brandt et al. | |
| 6,112,188 A | 8/2000 | Hartnett | |
| 6,115,691 A | 9/2000 | Ulwick | |
| 6,125,351 A | 9/2000 | Kauffman | |
| 6,125,390 A | 9/2000 | Touboul | |
| 6,128,708 A | 10/2000 | Fitzpatrick et al. | |
| 6,138,112 A | 10/2000 | Slutz | |
| 6,145,121 A | 11/2000 | Levy et al. | |
| 6,167,534 A | 12/2000 | Straathof et al. | |
| 6,175,833 B1 | 1/2001 | West et al. | |
| 6,195,676 B1 | 2/2001 | Spix et al. | |
| 6,230,319 B1 | 5/2001 | Britt, Jr. et al. | |
| 6,237,035 B1 | 5/2001 | Himmel et al. | |
| 6,237,143 B1 | 5/2001 | Fontana et al. | |
| 6,243,862 B1 | 6/2001 | Lebow | |
| 6,247,029 B1 | 6/2001 | Kelley et al. | |
| 6,249,877 B1 | 6/2001 | Kawakami et al. | |
| 6,252,869 B1 * | 6/2001 | Silverman | 370/352 |
| 6,269,479 B1 | 7/2001 | Puram | |
| 6,279,039 B1 | 8/2001 | Bhat et al. | |
| 6,301,701 B1 | 10/2001 | Walker et al. | |
| 6,311,327 B1 | 10/2001 | O'Brien et al. | |
| 6,363,499 B1 | 3/2002 | Delo et al. | |
| 6,363,524 B1 | 3/2002 | Loy | |
| 6,374,358 B1 * | 4/2002 | Townsend | 726/1 |
| 6,405,250 B1 | 6/2002 | Lin et al. | |
| 6,405,364 B1 | 6/2002 | Bowman-Amuah | |
| 6,411,910 B1 | 6/2002 | Eulau et al. | |
| 6,424,981 B1 | 7/2002 | Isaac et al. | |
| 6,427,132 B1 * | 7/2002 | Bowman-Amuah | 703/22 |
| 6,438,749 B1 | 8/2002 | Chamberlain | |
| 6,446,126 B1 | 9/2002 | Huang et al. | |
| 6,463,454 B1 | 10/2002 | Lumelsky et al. | |
| 6,466,980 B1 | 10/2002 | Lumelsky et al. | |
| 6,467,052 B1 | 10/2002 | Kaler et al. | |
| 6,470,464 B2 | 10/2002 | Bertram et al. | |
| 6,477,471 B1 | 11/2002 | Hedstrom et al. | |
| 6,502,207 B1 | 12/2002 | Itoh et al. | |
| 6,505,176 B2 | 1/2003 | DeFrancesco, Jr. et al. | |
| 6,513,154 B1 | 1/2003 | Porterfield | |
| 6,519,763 B1 | 2/2003 | Kaufer et al. | |
| 6,526,443 B1 | 2/2003 | Goldsmith et al. | |
| 6,546,506 B1 | 4/2003 | Lewis | |
| 6,560,580 B1 | 5/2003 | Fraser et al. | |
| 6,578,004 B1 | 6/2003 | Cimral et al. | |
| 6,578,006 B1 | 6/2003 | Saito et al. | |
| 6,584,447 B1 | 6/2003 | Fox et al. | |
| 6,587,841 B1 | 7/2003 | DeFrancesco et al. | |
| 6,601,017 B1 | 7/2003 | Kennedy et al. | |
| 6,601,018 B1 | 7/2003 | Logan | |
| 6,601,233 B1 * | 7/2003 | Underwood | 717/102 |
| 6,626,953 B2 | 9/2003 | Johndrew et al. | |
| 6,629,266 B1 | 9/2003 | Harper et al. | |
| 6,701,514 B1 * | 3/2004 | Haswell et al. | 717/115 |
| 6,820,088 B1 | 11/2004 | Hind et al. | |
| 6,895,382 B1 * | 5/2005 | Srinivasan et al. | 705/7.17 |
| 6,920,467 B1 | 7/2005 | Yoshimoto | |
| 6,934,934 B1 | 8/2005 | Osborne, II et al. | |
| 6,950,802 B1 * | 9/2005 | Barnes et al. | 705/7.22 |
| 6,968,324 B1 * | 11/2005 | Ruffin et al. | 705/400 |
| 7,020,621 B1 * | 3/2006 | Feria et al. | 705/7.29 |
| 7,069,234 B1 * | 6/2006 | Cornelius et al. | 705/80 |
| 7,127,421 B1 * | 10/2006 | Beacham et al. | 705/35 |
| 7,139,999 B2 * | 11/2006 | Bowman-Amuah | 717/101 |
| 7,289,964 B1 * | 10/2007 | Bowman-Amuah | 705/1.1 |
| 7,403,901 B1 * | 7/2008 | Carley et al. | 705/2 |
| 7,437,304 B2 * | 10/2008 | Barnard et al. | 705/7.15 |
| 7,536,331 B1 * | 5/2009 | Pellegrino et al. | 705/36 R |
| 2002/0004912 A1 | 1/2002 | Fung | |
| 2002/0042751 A1 * | 4/2002 | Sarno | 705/26 |
| 2002/0069099 A1 * | 6/2002 | Knox et al. | 705/8 |
| 2002/0133593 A1 | 9/2002 | Johnson et al. | |
| 2002/0133757 A1 | 9/2002 | Bertram et al. | |
| 2002/0138571 A1 | 9/2002 | Trinon et al. | |
| 2002/0143929 A1 | 10/2002 | Maltz et al. | |
| 2002/0147961 A1 | 10/2002 | Charters et al. | |
| 2002/0162090 A1 | 10/2002 | Parnell et al. | |
| 2002/0165754 A1 | 11/2002 | Tang et al. | |
| 2003/0004848 A1 | 1/2003 | Hellerstein et al. | |
| 2003/0018573 A1 * | 1/2003 | Comas et al. | 705/38 |
| 2003/0018952 A1 | 1/2003 | Roetzheim | |
| 2003/0033586 A1 | 2/2003 | Lawler | |
| 2003/0041000 A1 | 2/2003 | Zajac et al. | |
| 2003/0065644 A1 | 4/2003 | Horman et al. | |
| 2003/0120539 A1 | 6/2003 | Kourim et al. | |
| 2003/0144868 A1 | 7/2003 | MacIntyre et al. | |
| 2003/0188290 A1 | 10/2003 | Corral | |
| 2003/0196190 A1 | 10/2003 | Ruffolo et al. | |
| 2003/0212518 A1 | 11/2003 | D'Alessandro et al. | |
| 2003/0225662 A1 | 12/2003 | Horan et al. | |
| 2003/0225663 A1 | 12/2003 | Horan et al. | |
| 2005/0071807 A1 | 3/2005 | Yanai | |

OTHER PUBLICATIONS

Agostini et al., A Light Workflow Management System Using Simple Process Models, Cooperation Technologies Laboratory, Disco-University of Milano-Bicoca, Aug. 2000.

Yu, et al., An Analysis of Several Software Defect Models; IEEE Transactions on Software Engineering, vol. 14., No. 9; Sep. 1988.

Georgakopoulos et al., An Overview of Workflow Management: from Process Modeling to Workflow Automation Infrastructure, Kluwer Academic Publishers, Boston, Distributed Parallel Databases, vol. 3, p. 119-153, 1995.

Sammet, Beginning of 4.6 Software Evaluation, Tests and Measurements and RMF I/O Time Validation, Association of Computing Machinery, p. 519.

Betwixt: Turning Beans into XML, Apache Software Foundation, archived Jun. 20, 2002 at <http://web.archive.org/web/20020620000410/http://jakarta.apahce.org.commons/betwixt/>, p. 1 of 1, Nov. 13, 2005.

Muehlen, Business Process Automation and Workflow in the Financial Industry, CSK Software AG, Version 3, p. 1-37, Sep. 10, 2003.

Castor: Using Castor XML, ExoLab Group, archived Aug. 27, 2001 at <http://web.archive.org/web/20011019155934/http://www.castor.org/xml-framework.html>, retrieved from the internet on Nov. 11, 2005.

Code Generation for Database Applications, IBM Corporation, p. 1-3, Mar. 1, 2002.

Mohapatra et al., Defect Prevention through Defect Prediction: A Case Study at Infosys.

McConnell, Gauging Software Readiness with Defect Tracking; IEEE; May/Jun. 1997.

Hilbert, Hilbert, et al., An Approach to Large Scale Collection of Application Usage Data Over the Internet, Software Engineering 1998, Proceedings of the 1998 International Conference, Abstract, Apr. 1998.

Hudeponhl et al., Integrating Metrics and Models for Software Risk Assessment, The Seventh International Symposium on Software Reliability Engineering (ISSRE '96), p. 93, Oct. 30, 1996.

Hamilton, JavaBeans, Sun Microsystems, Chapter 8, Aug. 8, 1997.

Reinhart, Liability Management: A new Tool for Financial Consultants, Financial Consultant, vol. 1, No. 3, p. 7-11, Fall/Winter 1996, ISSN 1091-644X, Dialog File 15, Accession No. 01395382.

OS/2EE Database Manager SQLJRA Remote Protocol, IBM Corporation, IBM TDB N10-93, p. 33-36, Jan. 1, 1993.

Programmer's Guide; Monitor Client Library 12.5; Document ID 32865:01-1250-01.

Quantitative Monitoring of Software Development by Time-Based and Intercheckpoint Monitoring, Software Engineering Journal, vol. 5, Iss. 1, p. 43-49, Abstract, Jan. 1990.

Campione, et al., Special Edition Using Java Tutorial, Third Edition: A Short Course on the Basics, Addison Wesley Professional ISBN: 0201-70393-9, 21 pages from Chapter 5, Dec. 28, 2000.

Basili et al., Understanding and Predicting the Process of Software Maintenance Releases, 18th International Conference on Software Engineering (ICSE '96), Mar. 25-29; p. 464; (Abstract).

Wohlin et al., Understanding the Sources of Software Defects: A Filtering Approach, 8th International Workshop on Program Comprehension (IWPC '00), p. 9, (Abstract), Jun. 10, 2000.

Pitt and McNiff, java, RMI: the Remote Method Inovocation Guide, Addison Wesley Professional, ISBN: 0201-70043-3, Section 3.5, 3 pages.

* cited by examiner

SYSTEM AND METHOD FOR CHARACTERIZING AND SELECTING TECHNOLOGY TRANSITION OPTIONS

BACKGROUND

1. Field of the Invention

The present invention relates to a method and system for characterizing and selecting technology transition options. In particular, the present invention relates to a method and system for selecting transition options using techniques adapted from those used in financial markets.

2. Description of the Related Art

Increasingly, project managers and technology managers are confronted with difficult decisions on which technologies to use for their projects, or select as standards for the business. The factors for consideration have moved beyond the technical fit or elegance of the technology to many other dimensions—including vendor stability, technology-sector volatility and programmer mind-share.

Systems, methods and techniques are needed to support structured decision-making in the selection of technology migration options.

SUMMARY OF THE INVENTION

In one aspect, the instant invention provides a system and method for structured development of migration options in a legacy transactional enterprise. The invention identifies components of the legacy enterprise, develops risk factors for the components of the legacy enterprise, identifies unmet opportunities, develops risk factors for the unmet opportunities, identifies potential components for the legacy enterprise, develops risk factors for the potential components of the legacy enterprise, and develops the migration options with associated risks using at least the risk factors for the components, the risk factors for the unmet opportunities and the risk factors for the potential components.

In this manner, the instant invention advantageously supports structured decision-making in the selection of technology migration options.

The foregoing specific aspects and advantages of the invention are illustrative of those which can be achieved by the present invention and are not intended to be exhaustive or limiting of the possible advantages that can be realized. Thus, the aspects and advantages of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

The instant invention adapts certain techniques used for investment portfolio analysis and management to the selection of business technology investments. In a simplistic manner, it is possible to rate each technology as a buy, hold or sell. While this is helpful in understanding the current technology portfolio, a more systematic risk management and economics based approach is desirable for consideration of alternative technologies and migration options. This allows greater understanding and insight into the choices regarding technology holdings, both current and future, and management of the risks of this portfolio.

The instant invention provides a general guide for decision making under conditions of technology uncertainty. The invention is a framework for understanding the total cost of ownership including the effect of uncertainty factors such as vendor risk and technology sector stability. The more comprehensive and realistic the budgets and cost drivers that are produced, the better the discussion of technology decisions with business managers. Additionally, in many cases it is possible to analyze quantitatively the cost of hedging particular technologies and pricing the "real options" in a project plan.

A System According To The Instant Invention

Figure 1:
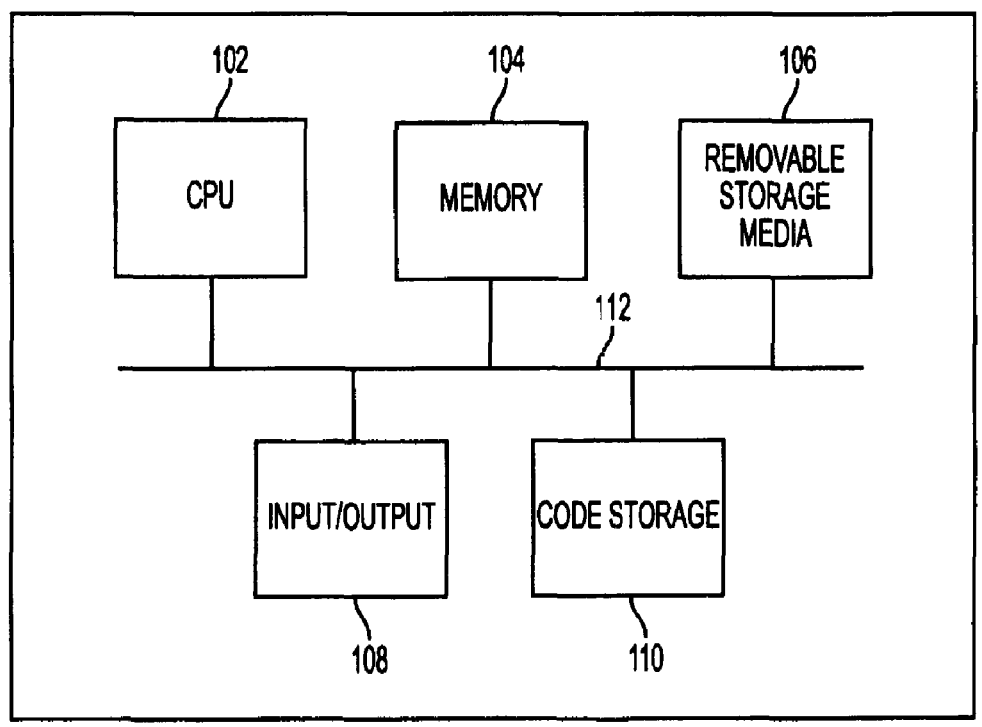
FIG. 1 illustrates an embodiment of a system according to the instant invention.

Referring to FIG. 1, an embodiment of system 100 of the instant invention includes individual components such as: central processor 102; memory 104; removable code storage 106; input/output 108; and fixed code storage 110. The individual components are interconnected by system bus 112

A Method According To The Instant Invention

Figure 2:
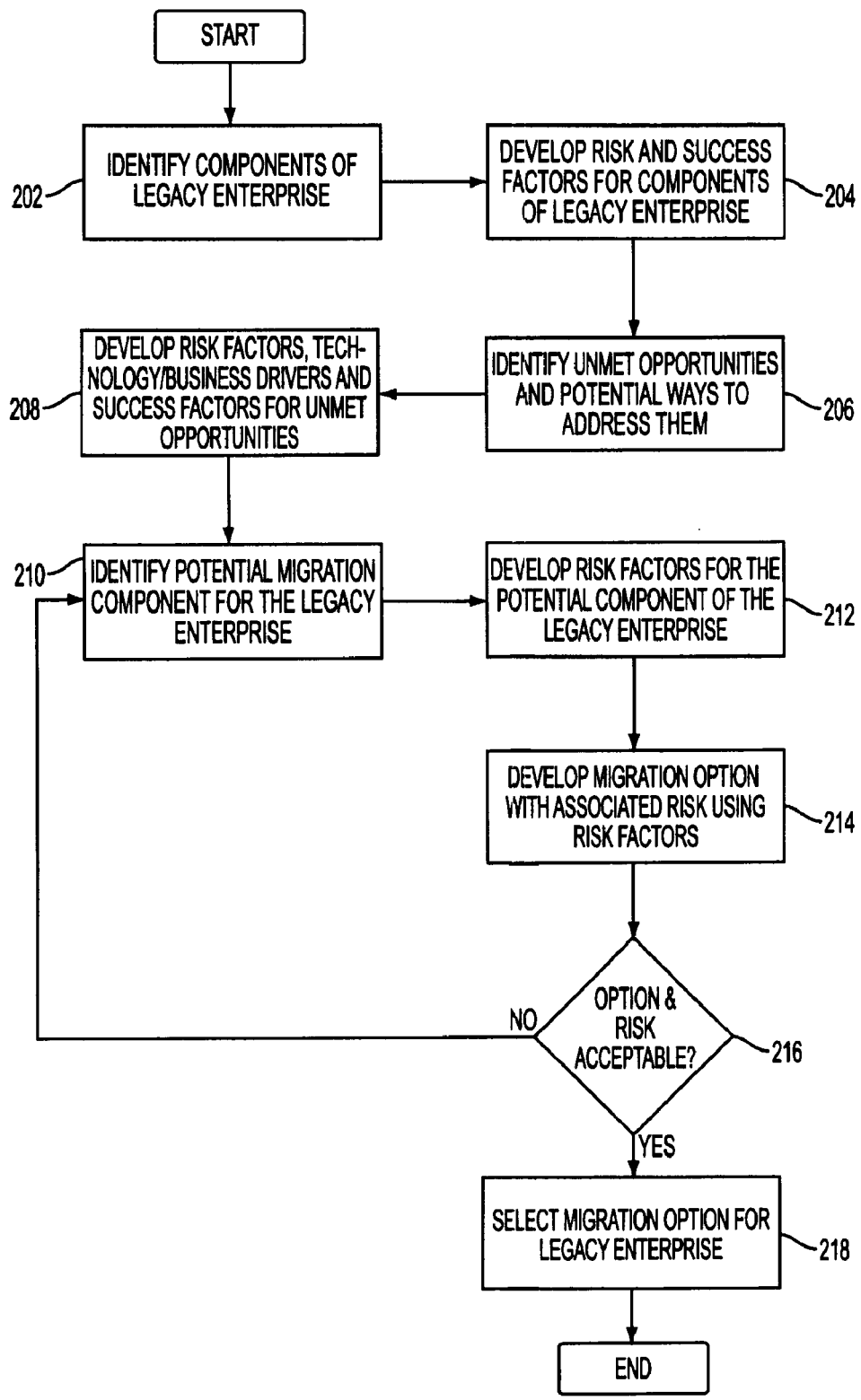
FIG. 2 illustrates an embodiment of a method according to the instant invention.

Referring to FIG. 2, an embodiment of a method according to the instant invention includes identifying components of a legacy enterprise (202); developing risk and success factors for those components of the legacy enterprise (204); identifying unmet opportunities and potential ways to address the unmet opportunities (206); developing risk factors, technology/business drivers and success factors for the unmet opportunities (208); identifying potential migration components for the legacy enterprise (210); developing risk factors for the potential components (212); developing migration options with associated risk using the risk factors from steps 204, 208 and 212 (214); and determining whether the option and risk are acceptable (216). If the option and risk are not acceptable, identifying other potential migration components for the enterprise (210), and if the option and risk are acceptable, selecting the migration option for the enterprise (218).

These aspects of the instant invention are explained in greater detail with reference to FIGS. 3-7.

Figure 3:
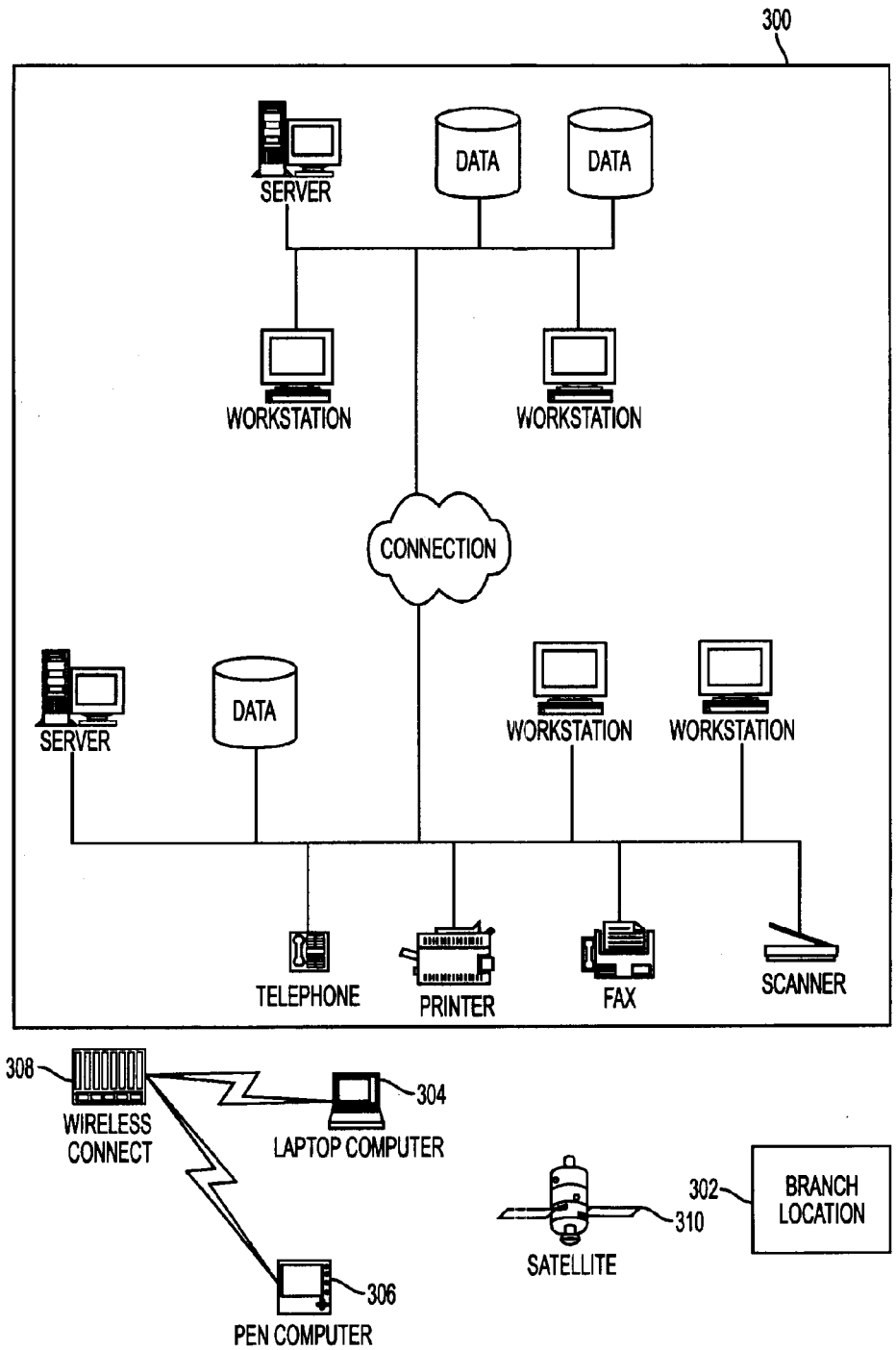
FIGS. 3-7 illustrate migration options in an example of the instant invention.

Referring to FIG. 3, legacy enterprise 300 includes various individual technology components. These components include hardware, as well as software running on the hardware. An enterprise manager, faced with unmet technology opportunities to satisfy business needs of providing information connectivity to remote workers, considers potential migration options. The manager can consider a fixed site branch location 302, or a virtual workspace for the remote workers. With a virtual workspace, the workers maintain information connectivity using wireless connections 308 to hardware such as laptop computers 304, or personal digital assistants/pen computers 306. Connection between enterprise 300 and the branch location 302 can be by traditional terrestrial land-line, or possibly by satellite 310. Without more information and insight, the enterprise manager is uncertain of the trades between performance, costs and risks for these various migration options.

Figure 4:
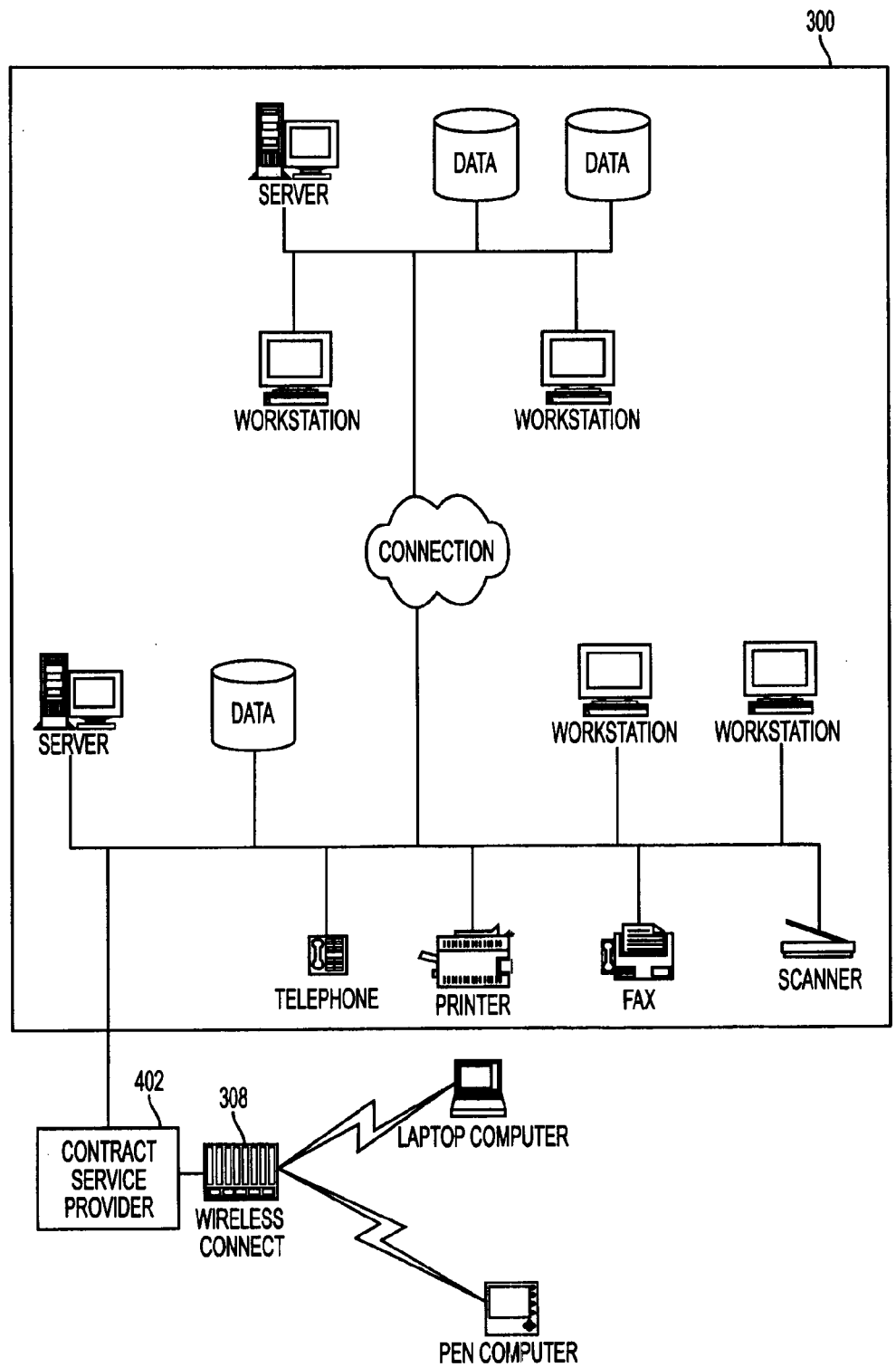
Figure 5:
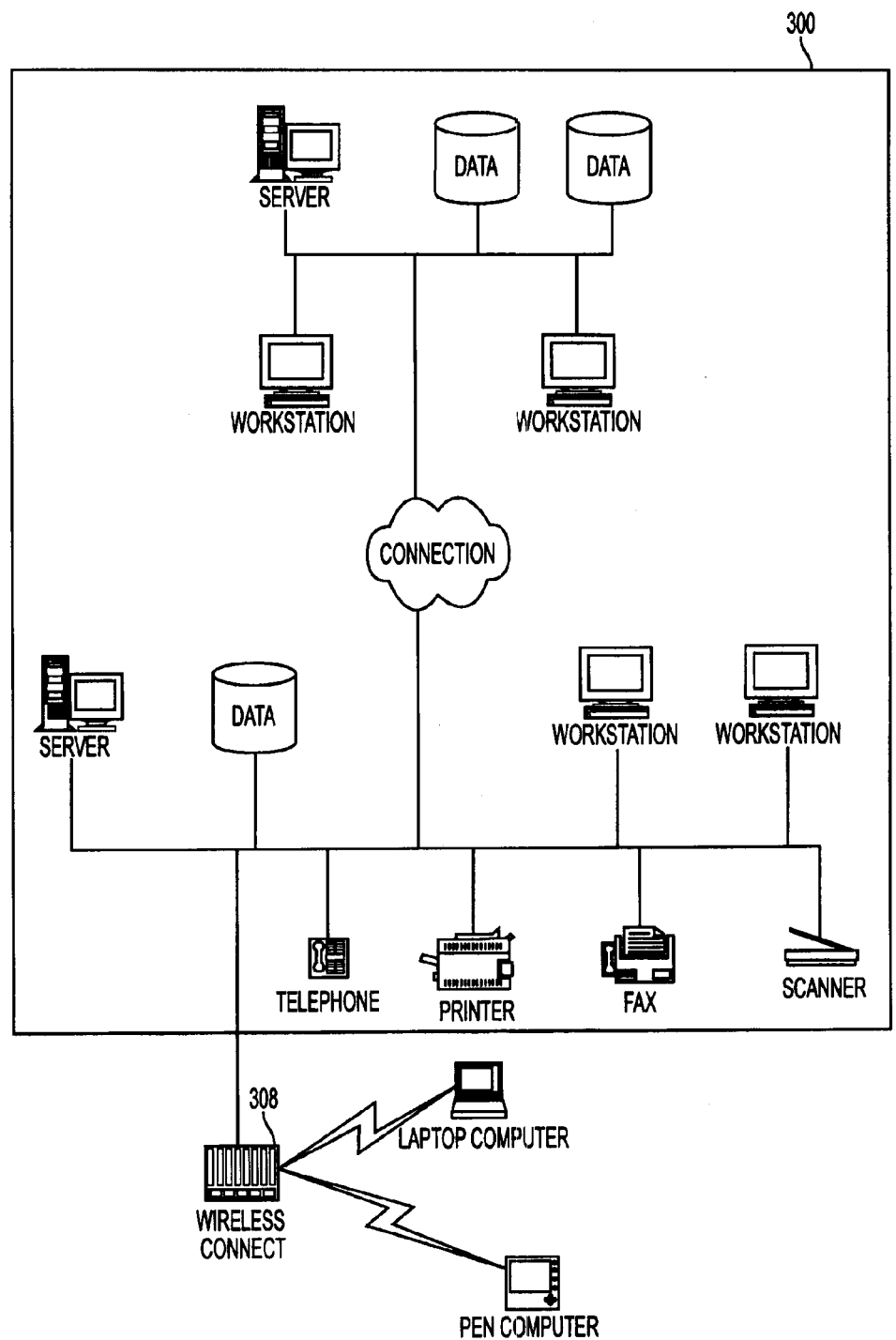

Referring to FIGS. 4 and 5, if the manager considers a virtual workspace, she has further migration options for establishing and migrating to that virtual workspace. For example, as illustrated in FIG. 4, the manager might consider a contract service provider 402 for the connection between the enterprise 300 and the wireless connection 308.

Alternatively, referring to FIG. 5, the manager might arrange and maintain the connection between the enterprise 300 and the wireless connection 308, as a new part of the enterprise. This might require acquisition of additional hardware, hiring of people with the needed skills and talent, lease of communication lines, etc.

With these two migration options, there are associated risks, costs, and cost uncertainty. By selecting the migration option illustrated in FIG. 4, assuming the contract service provider has significant experience in this area, the costs are well known, and the risk is relatively low. By selecting the migration option illustrated in FIG. 5, the costs may be lower, but there is greater uncertainty in the costs, and also greater risk.

Figure 6:
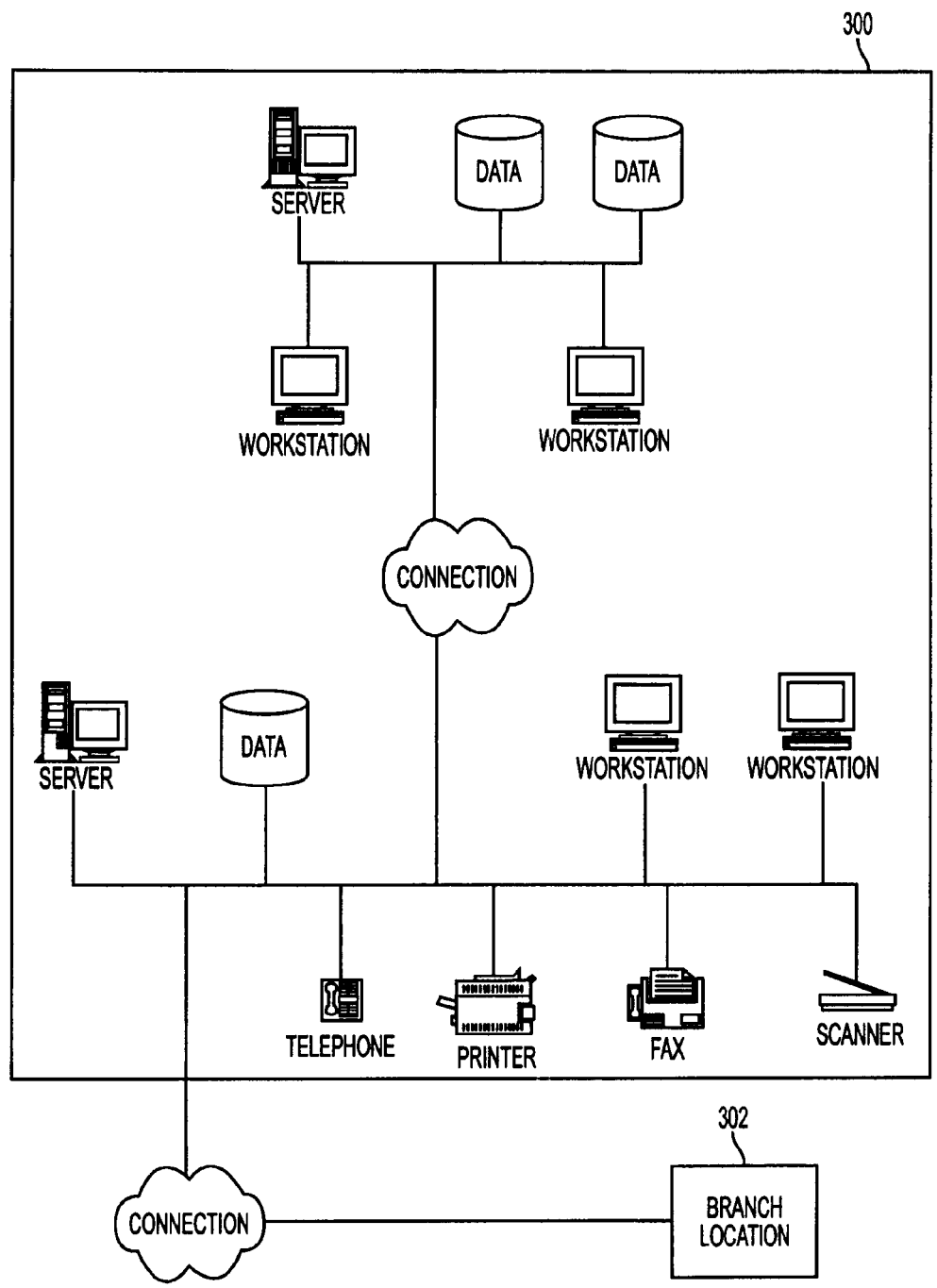
Figure 7:
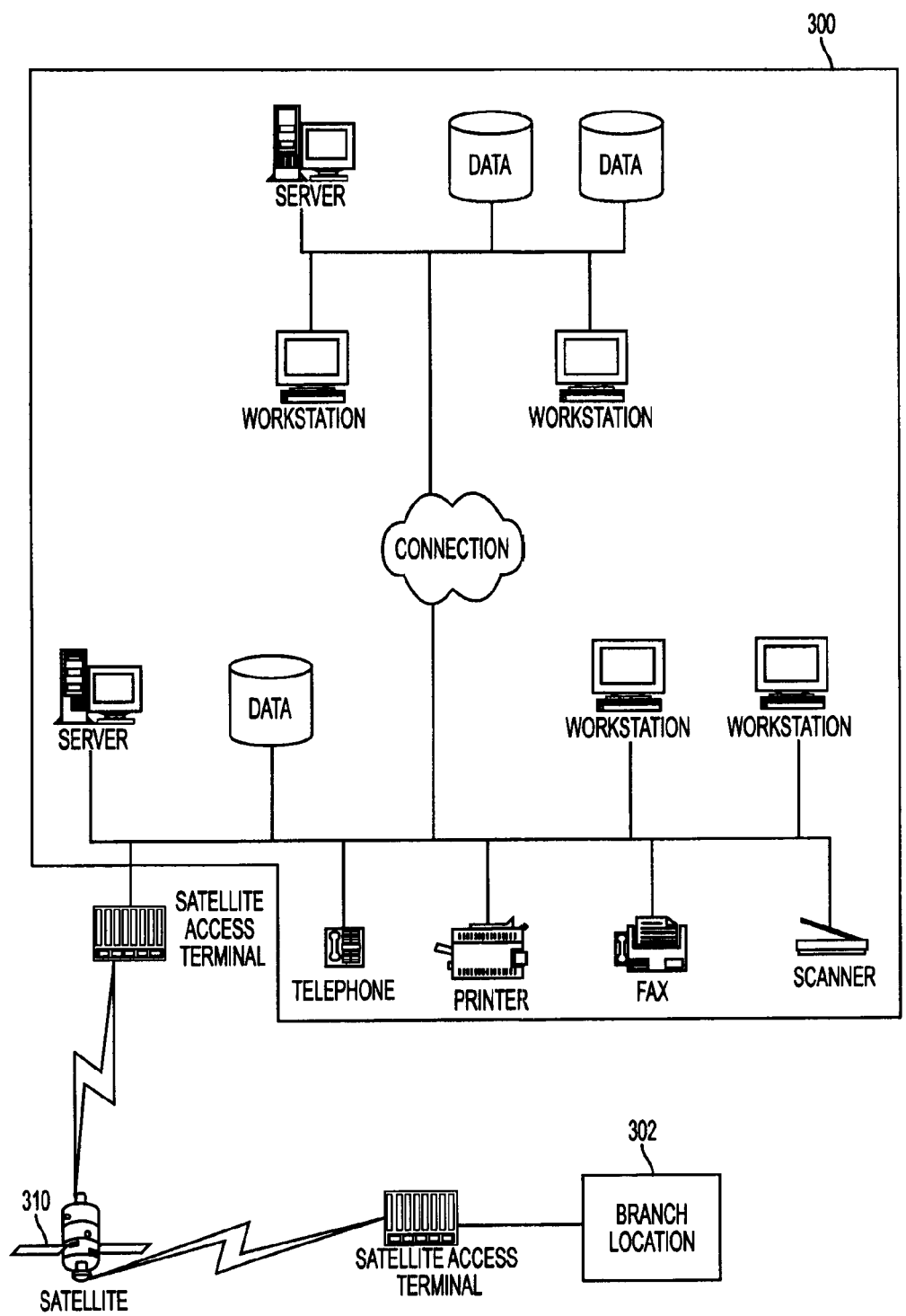

The enterprise manager must also consider migration to a fixed branch location, with the associated costs and risks. Referring to FIG. 6, one migration option includes a traditional terrestrial connection between enterprise 300 and branch location 302. Here, the system capabilities, costs and cost uncertainty are relatively known and stable. Alternatively, referring to FIG. 7, one migration option includes a satellite connection between enterprise 300 and branch location 302. Here, the system capabilities, costs and cost uncertainty are also relatively known and stable. However, the migration option illustrated in FIG. 7 may provide for a more dependable and robust wideband connection between enterprise 300 and branch location 302, which may be very important if there are time-critical and high volume data exchange requirements. Accordingly, even if the costs for the satellite link option illustrated in FIG. 7 are higher than the costs of the terrestrial link option illustrated in FIG. 6, the additional performance and capability of a dedicated satellite link may offset the costs.

With these various possibilities, the instant invention helps technology project managers: improve their understanding of risk for large investments while dealing with shifts in technology due to changes in business events; make informed choices regarding technology trade-offs; and characterize project risk in a language that is shared with their business counterparts.

From a functional standpoint, one aspect of the invention is to provide project managers with tools, thereby allowing them to do at least some of the following: identify and quantify the risks and uncertainties of each of the component technologies, (for example, my expected costs are X and my uncertainty in X is Y%); allow straightforward comparison of different plans in economic terms, (for example, technology component A is more expensive than component B when one takes into account the uncertainties); price optionality in the project plan, (for example, with a future decision point as an option in the project plan, what are the costs of this option and what are the benefits?); and facilitate construction of hedge strategies, (for example, we choose technology A but know it's risky; how do we hedge the risk?).

The instant invention uses a generic and encompassing set of costs to analyze any technology decision process. Included with these costs are a set of "risk attributes", which are designed to help the decision-maker identify the key risks associated with a particular decision and estimate their uncertainty about a particular cost component. In many cases, technology component descriptions will include information that can be used to help characterize the risk in a technology.

The invention also provides an analytical treatment of technology decisions, framed in the language of real-options. Risk attributes are used to help identify areas of cost uncertainty. There are several different approaches to pricing the optionality in the decision process and hedging the uncertainty. Alternatively, hedge pricing is used as a way to quantify real uncertainty in a decision that might be difficult to get at from a low-level cost analysis.

At a high level, the technology for a typical project/decision has three cost components: raw costs, compensatory costs and uncertainty costs. The raw costs are generally the easily identified hardware, license, development, maintenance, and other expenses associated with the technology. The compensatory costs are those up-front costs that are anticipated and cover a known deficiency in the technology. The uncertainty costs are funds set aside or invested appropriately in a technology or market hedge to cover possible over-runs. These three cost components are the basis for a methodology for pricing technology oriented projects, by taking into account identifiable and quantifiable uncertainty to enable decision makers to do as well as possible with the available information.

Part of the process of budgeting a technology project is the mapping of each cost and technology component onto a set of risk attributes. So, for example, in addition to knowing the raw costs and a reliability rating for a product, one would like to know the compensatory costs associated with its unreliability (e.g., support and maintenance) and the uncertainty in that cost estimate. These risk attributes are discussed in greater detail below, and are categorized as product suitability, deployability, technology sector stability/volatility, and vendor Risk.

The following provides guidelines in assessing technology, a description of the components of the total cost of ownership, important risk dimensions for technology selection, and a use-case.

Technology Assessment

The invention starts with a definition of the problem. To develop this, the project manager must: provide time frames and system, organizational, and business characteristics that give context to the assessment; formulate an "Economic Analysis Question" that describes the problem they are addressing using technology; identify all technologies associated with the problem; and determine which technologies are key to future investment decisions and perform an assessment of each using a risk analysis template.

Total Cost of Ownership

The invention enumerates the cost elements which enter into a typical technology decision. For each of these cost elements, a projected cost, a rating, an uncertainty and optionally an associated cost is assigned. These cost elements include:

Cost of adoption—the cost of setting up the initial environment to accept major new technology changes.

Cost of development—the cost of people and systems to create original source code.

Cost of Maintenance—the cost of people and systems to provide preventative and incremental improvements on systems.

Cost of Migration—the cost of turning off old systems, re-integration with dependent systems.

Cost of Support—the cost of people and systems to help in the case of application and system failure (fix problems) (e.g., Networks, PC's business programs).

Cost of Business Use—the cost of people and resources to support business users.

Each of these cost elements are broken out into two components, Application Delivery (AD), and Support & External components. In addition to projections for each of these cost components, a project plan also attempts to quantify the uncertainty in these projections. For example:

Cost of Migration=$0.9M+/−0.2$M

Cost of Support=$1.3 M (low scenario, 20% probability), $1.7M (expected scenario, 70%), $2.1M (high scenario, 10%)

Cost of Maintenance=$4.1M over three years.

Standard deviation is 10% first year, 20% second year, 40% third year

Risk Dimensions

Associated with any technology are a number of attributes that may be contributing factors to the risk of using that technology and hence add uncertainty to the total cost of ownership. Using the invention, a project planner attempts to consider as many of these as possible when quantifying the uncertainty component of the core costs. For a financial services industry, the following are representative components.

Dimensions of Risk

For each of the following items, a rating (e.g., 1-5), an uncertainty and an associated cost is assigned.

Product Suitability or confidence in meeting requirements.

Product Reliability—Will the technology product provide required functions, consistently with limited need for correction?

Risk of obsolescence—What is the potential of the product no longer being available in the marketplace?

Feature function ability—Do the functional capabilities of the product sufficiently meet business requirements?

Time on the market (counter indicator—this is not a good indicator in most cases, but a warning flag)

Deployability

Knowledge of Technology—What fraction of IT Professionals have working experience with use, application and support of specified technology, in the area of Application Delivery (AD) and Support?

Ease of deployment (Support)—Level of difficulty in rolling-out, integrating a technology.

Ease of implementation (Application Delivery)—Level of difficulty of constructing applications using a technology?

Integration risk—Probability of technology not readily integrating into current operating environment either due to non-conformance with standards or some form of instability?

Global deployment risk—Level of difficulty in rolling-out, integrating a technology in multiple locations across a diverse network environment?

Technology Sector Stability/volatility

Rate of adoption of technology class—How quickly are firms investing in the technology, both across industries (# of users) and within the financial services industry (# of firms)?

Rate of change of technology class—How quickly is technology changing within the class?

Vendor Risk

Marketshare—In a technology class, what percentage of the market does the Vendor control?

Level of adoption of vendor's technology—Within industry segment, how many users of the technology exist, both across industries (# of users) and within the financial services industry (# of firms)?

Change in marketshare—adoption rate—Within industry segment, at what rate are new users being added to the user base, both across industries (# of users) and within the financial services industry (# of firms)?

Programmer mindshare—What percentage of IT professionals currently have working knowledge of the technology, in the areas of Application Delivery and Support?

Rate of change of the product—How many product releases/updates are provided by Vendor annually?

Quality of product releases—How well do releases match stated functionality i.e. eloquence of solution and ease of integration?

Quality of support—How well does the vendor address problems with the technology?

AN EXAMPLE

At J. P. Morgan, the economic analysis question is: What is the risk of continued use of a particular settlement processing system, with focus on the VMS technology component?

Using a sample of the overall risk dimensions provided by the invention, the example evaluates the VMS component.

As background Information, the time frame is 1996. The VAX/VMS system is characterized as mature and is used for settlement processing. However, there are vendor availability and support issues, and capacity constraints.

The following components are identified as the key technologies: VAX; VMS (the area of focus); Ingres; VAX Basic; Storage/High Availability (with MTI Disk Controllers); AD Teams due to Custom Application build (e.g., staffing issues required to build a custom application, as compared to purchase of a custom application); and connectivity. Using this infonnation and the instant invention, the technology manager assigns ratings, uncertainty and associated costs as exemplified in Table 1 below.

TABLE 1

| Dimensions of Risk | Rating | Uncertainty | Associated cost |
|---|---|---|---|
| Product Suitability or confidence in meeting requirements | | | |
| Product Reliability | 5-good | Low | Cost of Support |
| Risk of obsolescence | 1-high | Low | Cost of Migration |
| Feature function ability | 4-good | Low | Cost of Maintenance |
| Vendor Risk Market share (in this case: operating system technology-) | | | |
| Level of adoption of vendor's technology | 6%-low | | |
| Across industries (# of users) | 200,000 3-Med | Low | Cost of maintenance Support vs. AD |
| Within the financial service industry (# of firms) | 12 firms 1-Low | Low | Cost of support Support vs. AD |
| Change in marketshare-adoption rate | | | |
| Across industries | (−) declining | Low | |
| Within the financial service | (−) declining | Low | Cost of migration from current |
| Programmer mindshare | | | |
| Support | 3-Medium | High | Cost of maintenance |
| AD | N/A | Medium | Cost of migration from current |
| Rate of change of the product | 1-Low | Low | Cost of maintenance |
| Quality of product releases | 5-High | High | Cost of maintenance |
| Quality of support | 4-High | Medium | Cost of support Cost of migration |

Scale: 1-5 (5 = good)

Summary of Analysis

The example analysis of VMS results indicates that VMS is a reliable operating system that works fine in its current environment. However, there is a known risk of obsolescence that may lead to "knowledge of technology risk" due to an inability to retain the skill set. The impact of this risk will necessitate planning for migration and potential increased support costs.

Additionally, the operating system is a technically stable product facing declining marketshare across all industries, and particularly in the financial industry. The decline further supports the necessity to plan for migration. This decline naturally leads to the vendor having fewer dollars to allocate towards product changes and support of the product. Due to the uncertainty about the Vendor's ability to manage the quality of future releases, the future cost of maintenance and support is uncertain and it may be necessary to hedge against this risk.

The invention illustrates how one imposes a real-options analysis framework on a simple, one-step decision making process (this analysis can be extended to apply to multi-step processes as well, such as staged investments). The type of decision we examine is a fairly generic one: a selection between a software technology BrandX and technology BrandY, where BrandX is more expensive and BrandY is cheaper but is less certain. BrandX or BrandY is being chosen as a hedge/replacement for BrandZ which is used extensively throughout the bank. The motivation is that BrandZ is losing market share, not keeping up technically on all fronts and eventually will be a non-viable choice for the bank.

In this situation, it makes sense to consider the following strategies (many others are possible, of course):

I. Choose BrandX today: high cost but fairly safe
II. Choose BrandY today: lower cost but risky
III. Stay with BrandZ for some period of time and re-evaluate later: known cost
IV. Choose BrandY today but pay for a hedge Strategy III can be viewed as an example of hedging with a time-option. There are uncertainties associated with a particular decision and hence one delays the decision in order to reduce uncertainty. The expenses associated with this delay are the option premium one pays.

a) Present the decision process in a simplified setting that emphasizes the real-option paradigm and why one purchases a time-option;
b) Identify the sorts of uncertainty leading to this option having value; and
c) Discuss alternative hedging possibilities.

Real Option Setting

Figure 8:
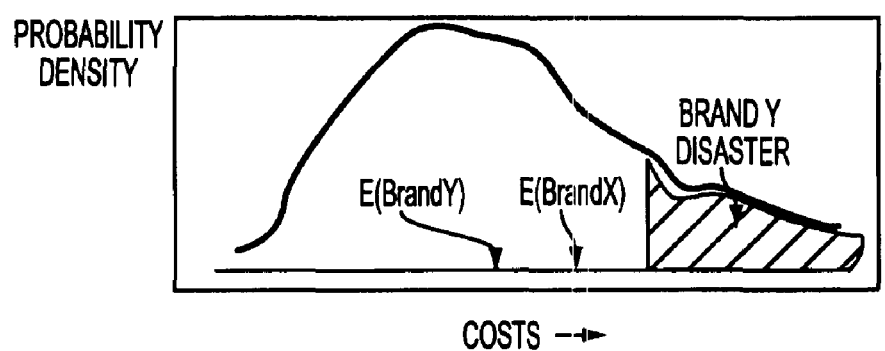
FIG. 8 illustrates a diagram of uncertainty.

The basic premise for this decision is that BrandX is a high cost, low-uncertainty choice and BrandY is a lower cost, high-uncertainty choice. We will make the simplification that the true cost of the BrandX decision is known exactly (out to some time-horizon) and (for the same time horizon) the cost of BrandY is greatly uncertain. In this model, even if the expectation of the BrandY cost is less than the BrandX cost, one wants to hedge against disaster—the possibility that the real costs of the BrandY decision are much higher than expected. This is illustrated in FIG. 8, which is a Heuristic diagram of BrandY uncertainty. The probability of a particular value of BrandY total cost is graphed as a function of cost. Very low and very high costs have low probabilities; moderate costs have high probabilities. E(BrandX) refers to the expected cost of the BrandX choice; E(BrandY) is the expected value of BrandY cost. The area labeled Brand Y disaster represents "bad" scenarios for BrandY.

In the simplified world we are considering, it will be assumed that the costs associated with the BrandY decision will become certain after some period of time T. Therefore, we can buy a time-option by delaying our decision for the time T and paying the costs associated with this delay (the option premium). See the next section for examples of some of these costs. After time T, there are two likely outcomes:

a) The costs of BrandY are still sufficiently uncertain so one is left with the earlier mentioned options (including rolling over the time option)
b) If the costs of BrandY have become certain (and BrandX's have remained certain) a decision between the two should be possible We view the option premium as a cost for making a more informed decision. If the situation is slow to clarify (i.e., outcome "a" above occurs several consecutive times), it may become clear that the cost of this insurance is too great and one decides to hedge in some other way, live with a risky decision, or take the safe route.

Uncertainties and Associated Costs

In Table 2, we discuss the types of uncertainty surrounding the BrandY product and the associated costs for a project utilizing BrandY.

TABLE 2

| Uncertainty Area (Brand Y) | Associated Costs (typical project) |
| --- | --- |
| Feature Function ability | Cost of Development/Maintenance |
| Risk of obsolescence | Cost of Migration-away from BrandY |
| Knowledge of Technology (Application devel.) | Cost of Development/Maintenance |
| Knowledge of Technology (Support) | Cost of Support |
| Level of adoption of vendor's technology | Cost of Development/Maintenance/Support |
| Rate of change of product | Cost of Maintenance |
| Quality of product releases | Cost of Maintenance |
| Programmer mind share | Cost of Migration-away from BrandY/Development |

For example, AD costs could be high if (a) BrandY is slow to add needed features/functionality leading to more development time, or (b) BrandY never reaches a critical marketshare leading to expensive AD resources. (There are clearly sub-scenarios where the costs of staying with BrandY become so high that another switch is necessitated.)

Cost of Option

Here we want to analyze the premium of the time-option, the additional costs incurred due to waiting. For each possible choice at the end of the period, we can compute the difference between total (N-year) costs if we use BrandX or BrandY starting today and waiting until t=T before starting with BrandX or BrandY. Some useful terms are provided in Table 3 below.

TABLE 3

| | |
| --- | --- |
| X0 = E(X0) | Known costs over next N years if we start using BrandX today (and start phasing out BrandZ today) discounted to decision date |
| XT = E(XT) | Known costs over next N years if we start using BrandX in time T (and don't phase out BrandZ until time T) discounted to decision date. |
| E(Y0) | Expected costs over next N years if we start using BrandY today (and start phasing out BrandZ today) discounted to decision date |
| E(YT) | Expected costs over next N years if we start using BrandY in time T (and don't phase out BrandZ until time T) discounted to decision date |
| PX | Probability we choose BrandX at time T (i.e., after time T BrandY turns out to be more expensive than BrandX) |

TABLE 3-continued

| | |
|---|---|
| PY | Probability we choose BrandY at time T (i.e., after time T BrandX turns out to be more expensive than BrandY). PX + PY = 1, i.e. we will definitely choose BrandX or BrandY at time T. |
| DX | Cost of delaying for time T if we choose BrandX at the end of time T |
| DY | Cost of delaying for time T if we choose BrandY at the end of time T |

What we end up paying for the delay option will be one of the delay costs, DX or DY depending on whether we choose BrandX or BrandY at time T. The expected cost of the delay option may be viewed as a weighted average of the two and given the distribution of BrandY costs, the two choices at time T can be weighted appropriately:

Price=PX*DX+PY*DY

In practice, of course, one ends up paying either DX or DY for the option. In figuring the delay costs DX and DY one might consider:

Potential additional migration costs to BrandX or BrandY of projects that get started with BrandZ Uncertainty costs surrounding BrandZ over this period—what happens if BrandZ goes out of business during this time Increases in costs of ownership for BrandX or BrandY if decision is delayed (for instance, increased license costs).

We can also consider what the option should be worth on theoretical grounds. A safe decision would be to choose BrandX today. On average, the expected cost of the delay strategy should be the same as taking the safe choice. Formally we can express this as:

E(X0)=Pricetheoretical+E(YT|YT<XT)+XT* PX

Here E(YT|YT<XT) is the expectation of BrandY costs at time T, conditional on the (known) costs of BrandY at time T being less than the costs of BrandX. We cannot expect the technology market to be efficient enough that the theoretical price Pricetheoretical and realized costs of the delay option align precisely, but they should be fairly close.

Alternative Hedging Strategies

If we accept the premise that the purpose of the delay strategy was to hedge against the possibilities of large costs arising after a choice of BrandY, it is fair to ask the following two questions:

1) Is there a way to hedge part of this risk? When I hedge with an option I should be able to choose the amount of portfolio insurance I need.

A partial hedge strategy might have been to buy a limited BrandY license and use it for some fraction of new projects but not all of them. Some projects would still be started with BrandZ. This reduces the risk of runaway BrandY costs but obviously entails a premium. (It may even be that this option is more valuable/costly than the delay strategy.) Another approach is to reduce the time horizon (expiration date) of the option so it is cheaper. This option is less valuable because it purchases a smaller reduction of uncertainty in the BrandY decision.

2) Is there another way to hedge the risk?

We could decide to go with BrandY but attempt to hedge the cost risk of BrandY with market strategies. The basic notion would be to buy a (market) option position with value that is positively correlated with these costs. For instance if the "worst-case" scenarios occurred with BrandY, the value of these positions would be large enough to recover some (all) of the migration costs. Here are some very simple examples.

Buy puts on BrandZ. The premise here is that we are only exposed to our decision of BrandY in the scenario that BrandZ collapses. This put is a financial transaction on the publicly traded equity of BrandZ.

Buy calls on BrandX or a basket of competitors. This call is a financial transaction on the publicly traded equity of BrandX or the basket of competitors.

Purchase an actual financial option on securities of a publicly company, or effectively purchase an option by investing in alternative technologies, such as through a small project.

The market hedge approach can be used as another way of estimating the fair price of the time option. If one can purchase a market hedge that protects against the down-side risk of the decision (essentially the width of the distribution to the right of E(BrandX)), the price of that hedge should be comparable to the option prices determined in the previous section.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A computer-implemented method for structured development of migration options in a legacy enterprise, the method comprising:
    identifying components of the legacy enterprise;
    developing risk factors for the components of the legacy enterprise;
    identifying unmet opportunities;
    developing risk factors for the unmet opportunities;
    identifying potential components for the legacy enterprise;
    developing risk factors for the potential components of the legacy enterprise;
    developing, by a computer, the migration options with associated risks using at least the risk factors for the components, the risk factors for the unmet opportunities and the risk factors for the potential components, and
    providing, by a computer, the migration options.

2. A method according to claim 1, wherein the components of the legacy enterprise are selected from the group consisting of hardware and software.

3. A method according to claim 1, wherein the unmet opportunities are selected from the group consisting of new hardware, new software and new business methods.

4. A method according to claim 1, wherein the potential components for the legacy enterprise are selected from the group consisting of hardware and software.

5. A method according to claim 1, wherein the potential components for the legacy enterprise include conceptual models of undeveloped capabilities.

6. A method according to claim 1, wherein the risk factors include multiple variables.

7. A method according to claim 1, wherein the risk factors are selected from the group consisting of cost and schedule.

8. A method according to claim 1, wherein the migration options with associated risk factors are selected from the group consisting of existing components and conceptual models of undeveloped capabilities.

9. A method according to claim 1, wherein the associated risks of the migration options are derived from the risk factors for the components of the legacy enterprise, the risk factors for the unmet opportunities, and the risk factors for the potential components of the legacy enterprise.

10. A non-transitory computer-readable medium having computer executable software code stored thereon, the code for structured development of migration options in a legacy enterprise, the code, when executed, causing a computer to:
   identify components of the legacy enterprise;
   develop risk factors for the components of the legacy enterprise;
   identify unmet opportunities;
   develop risk factors of the unmet opportunities;
   identify potential components for the legacy enterprise;
   develop risk factors for the potential components of the legacy enterprise; and
   develop the migration options with associated risk using at least the risk factors for the components, the risk factors for the unmet opportunities and the risk factors for the potential components.

11. A programmed computer for structured development of migration options in a legacy enterprise, comprising:
   a memory having at least one region for storing computer executable program code; and
   a processor for executing the program code stored in the memory;
   wherein the processor:
   identifies components of the legacy enterprise;
   develops risk factors for the components of the legacy enterprise;
   identifies unmet opportunities;
   develops risk factors for the unmet opportunities;
   identifies potential components for the legacy enterprise;
   develops risk factors for the potential components of the legacy enterprise; and
   develops the migration options with associated risk using at least the risk factors for the components, the risk factors for the unmet opportunities and the risk factors for the potential components.

* * * * *